No. 658,142. Patented Sept. 18, 1900.
G. A. & R. F. DUNN.
CAR.
(Application filed Sept. 7, 1899.)
(No Model.)

Witnesses:

Inventors,
George A. Dunn
Robert F. Dunn

UNITED STATES PATENT OFFICE.

GEORGE AMBROSE DUNN AND ROBERT FRANKLIN DUNN, OF DINUBA, CALIFORNIA.

CAR.

SPECIFICATION forming part of Letters Patent No. 658,142, dated September 18, 1900.

Application filed September 7, 1899. Serial No. 729,684. (No model.)

*To all whom it may concern:*

Be it known that we, GEORGE AMBROSE DUNN, a citizen of Canada, and ROBERT FRANKLIN DUNN, a citizen of the United States, both residing at Dinuba, county of Tulare, State of California, have invented an Improvement in Cars; and we hereby declare the following to be a full, clear, and exact description of the same.

Our invention relates to a car and a self-contained mechanism whereby its direction of travel may be changed without exterior or independent appliances.

It comprises details of construction which will be more fully explained by reference to the accompanying drawings, in which—

Figure 1:
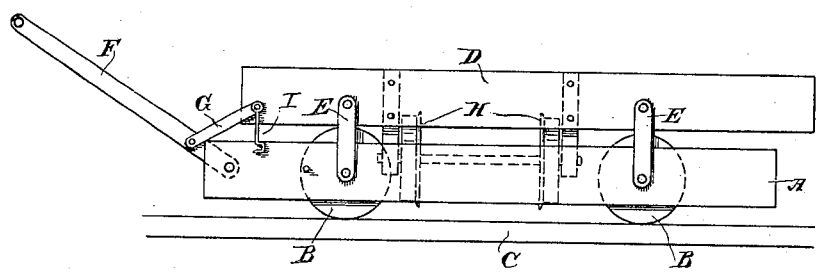
Figure 2:
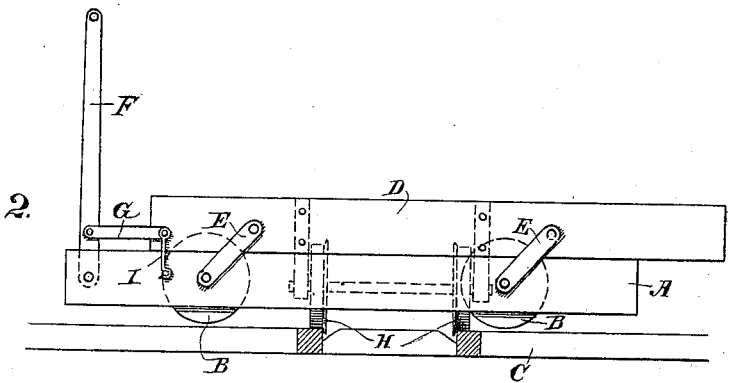

Figure 1 is a side elevation showing the car supported and in readiness to travel upon one set of wheels. Fig. 2 shows it supported upon the other set of wheels.

This car is particularly designed for use in places where it is necessary to move the car a distance in one direction and then to change its direction to travel transversely to its first line of movement, and is especially useful in places where it is impossible or inconvenient to employ turn-tables or similar devices for changing the direction of the car.

A is the main frame of the car, which is mounted upon wheels B, and these are adapted to run upon the track C or other support which will keep them in their line of travel.

D is an upper frame, which is connected with the lower frame by links E. The links may be simply connected parallel with each other, so as to operate like the parallel ruler, or they may be made in the form of knee-levers, one link being connected with the upper frame and the other with the lower frame and the contiguous ends united by pivot-pins with a mechanism by which the links can be straightened into vertical line with each other to raise the upper frame or allowed to bend at their junction to allow the upper frame to be depressed. In the present construction we have shown the links E as similar to the connections of a parallel ruler. To the front part of the lower frame is pivoted a lever arm or handle F, and by means of a link G this lever is connected with the front of the upper frame D.

H H are wheels the axles of which are journaled upon or carried by the upper frame D, so that the wheels are movable with the upper frame. This set of wheels is here shown as standing transversely with the line of travel of the wheels B of the lower frame, and the two sets of wheels are so journaled with relation to each other that when the upper frame D is raised to its highest point, the links E standing approximately vertical, the wheels H H will be lifted from the track or surface, while the wheels B will be resting upon the track C and in condition for operation. When in this position, the truck may be drawn along upon the rails or support C, the wheels H being, as before stated, raised and out of contact. When the point has been reached where the change of direction is to take place, the lever-arm F may be moved, so as to act through the link G to force the upper frame D down into contact with the top of the frame A. This action first depresses the wheels H until they rest upon the track or surface in the line of the new direction in which the car is to be moved. A further movement of the parts then acts by the leverage of the links E to raise the lower frame A, and with it its wheels B, until they are entirely clear of the surface. A locking device I of any suitable description is made to hold the frames in contact when the car is in readiness to move in its new direction. The weight of the car and whatever load there may be upon it will then be carried by the transverse wheels H, and it is in readiness to take its new direction. By this construction all parts necessary to provide for the change of direction of travel are carried upon the car and it is independent of any switches or arrangements of track or turn-table for changing its direction.

Having thus described our invention, what we claim as new, and desire to secure by Letters Patent, is—

1. In a car, the combination of superposed wheeled frames, pivoted links at the sides and connecting one frame with the other whereby one frame may be elevated above and lowered on top of the other, a hand-lever pivoted to one frame and projecting in the direction of the length thereof and a link connecting said lever with the other frame whereby the latter may be operated.

2. In a car, the combination of a main frame having bearing-wheels, a superposed frame having wheels journaled at right angles to those of the main frame, side links pivotally connected at opposite ends to said frames whereby one frame is permitted to be raised above and lowered onto the other frame, a lever fulcrumed to one frame and means connecting said lever with the other frame, and a hook on one frame and a pin or stud on the other frame engaged thereby to hold the frames together.

In witness whereof we have hereunto set our hands.

GEORGE AMBROSE DUNN.
ROBERT FRANKLIN DUNN.

Witnesses:
P. B. FULTON,
W. E. LANDROUS.